United States Patent [19]

Herder et al.

[11] 4,395,379

[45] Jul. 26, 1983

[54] METHOD AND DEVICE FOR FORMING AN INTERNAL ANNULAR GROOVE IN A PLASTIC TUBE PART

[75] Inventors: Kornelis Herder; Wilhelmus F. T. C. Olderaan, both of Hardenberg, Netherlands

[73] Assignee: Wavin B.V., Zwolle, Netherlands

[21] Appl. No.: 248,487

[22] Filed: Mar. 27, 1981

Related U.S. Application Data

[63] Continuation of Ser. No. 865,134, Dec. 28, 1977, abandoned, which is a continuation of Ser. No. 70,353, Aug. 28, 1977, abandoned.

[30] Foreign Application Priority Data

Jun. 30, 1977 [NL] Netherlands ................ 7707299

[51] Int. Cl.³ .................................... B29C 17/07
[52] U.S. Cl. .................... 264/573; 264/296; 425/DIG. 218
[58] Field of Search ............. 264/573, 296, 322; 425/DIG. 218, 387.1, 393

[56] References Cited

U.S. PATENT DOCUMENTS

| | | | |
|---|---|---|---|
| 2,365,637 | 12/1944 | Helwig | 264/544 X |
| 3,425,093 | 2/1969 | Ansette | . |
| 3,484,900 | 12/1969 | Sands | 425/393 |
| 3,823,216 | 7/1974 | Petzetokis | 425/DIG. 218 X |
| 3,899,565 | 8/1975 | de Putter | 425/DIG. 218 X |
| 3,989,439 | 11/1976 | Schmitzberger | 264/296 X |
| 4,105,087 | 4/1979 | de Putter | 425/393 X |
| 4,107,249 | 8/1978 | Muroi | 425/393 X |
| 4,170,448 | 10/1979 | French | 425/DIG. 218 X |

*Primary Examiner*—Thomas P. Pavelko
*Attorney, Agent, or Firm*—Wilkinson, Mawhinney & Theibault

[57] ABSTRACT

A socket of a thermoplastic pipe is provided with an internal groove by subjecting the tube to an upsetting action and simultaneously inflating the tube by an inner pressure. Subsequently a moulding ring is expanded and the tube is shrunk onto the expanded ring by cooling. Before shrinkage the inner diameter of the bottom of the groove is at least equal and preferably greater than the outer diameter of the moulding ring in expanded form.

1 Claim, 13 Drawing Figures

METHOD AND DEVICE FOR FORMING AN INTERNAL ANNULAR GROOVE IN A PLASTIC TUBE PART

This is a continuation, of application Ser. No. 865,134, filed Dec. 28, 1977 which Ser. No. 070,353, filed Aug. 28, 1977 both abandoned.

BACKGROUND OF THE INVENTION

This invention relates to a method of forming an internal annular groove in a plastic tube part by pushing the tube part onto a core, surrounding same with a mould having an annular recess and by forming the groove by applying an expandable and retractable groove forming ring in the interior of the tube part which ring is removed by retracting same after forming the groove and cooling down the plastic tube part.

Such a method for forming an internal annular groove in a plastic tube part wherein the groove forming ring is expanded by moving groove forming segments outwardly, is known.

Since the outer diameter and the inner diameter of the plastic tube part will increase at the location of the groove, this automatically involves a decrease of the thickness of the wall of the tube part at said location. Though it has been tried to alleviate this disadvantage by surrounding the plastic tube part by a loose bush or sleeve which is deformed simultaneously with the plastic tube part, this method has the drawback that much work expenditure is involved in mounting said separate bush or sleeve, while moreover the produced plastic tube parts do not, in a great number of cases, comply with present requirements.

SUMMARY OF THE INVENTION

The present invention aims to provide a method of the abovementioned type, not having these disadvantages.

This aim is achieved according to the invention in that the plastic tube part is subjected to the action of an internal medium over-pressure and preferably also to an upsetting operation, prior to the action of the groove forming ring.

By inflating the plastic tube part by means of the internal medium over-pressure and by upsetting same prior to the action of the groove forming ring a groove is produced, the wall thickness of which will remain unchanged so that the separate bush or sleeve can be omitted.

Another very important aim of the invention is to produce a groove having exact contours and a very smooth inner wall, as well as good properties of strength at the location of the groove, so that expediently the inner diameter of the groove formed by inflating equalizes at least the outer diameter of the expanded groove forming ring.

In this way the plastic tube part will shrink on the groove forming ring at the location of the groove when being cooled down, so that very good properties of strength of the plastic tube part are obtained at the location of the groove.

A groove is thus obtained having a very smooth inside, this contrary to the case when the groove is formed by expansion of the groove forming ring segments. These segments are namely gradually moved outwardly, whereby the joint between the various segments during the expansion is not immaculate, so that the inner side of the ready made groove has an irregular surface. During said expansion plastic material may even land between two adjoining segments, so that the inner surface of the ready made groove leaves much to be desired. This irregular surface may cause difficulties when a sealing ring is mounted.

The inner surface of the groove formed by an inflating fluid is expediently greater than the expanded groove forming ring. This inflated part is then shrunk upon the groove forming ring, which is a rigid groove forming ring.

The upsetting operation is expediently performed simultaneously with the action of the internal medium over-pressure.

So as to facilitate pushing the plastic tube part onto the core in order to form the groove, the recess in the core for expanding the groove forming ring is closed. The recess is opened during pushing the plastic tube part onto the core.

The invention also relates to a device for forming an internal annular groove in a plastic tube part, comprising a core, an expandable and retractable groove forming ring, members for expanding the expandable groove forming ring beyond the circumference of the core and members for retracting the groove forming ring within the periphery of the core, an outer mould with an annular recess for forming the groove and cooling members for cooling down the tube part in the region of the recess mentioned hereinbefore. The present device includes a medium line for exerting an internal over-pressure on the inner side of the plastic tube part in the region of the circular recess in the outer mould and preferably an upsetting member for upsetting the plastic tube part. The upsetting member appropriately comprises a ring with an extended thin part which closes the recess in the core at the beginning of pushing on the tube part, in which recess the groove forming ring or groove forming ring parts are accomodated.

The distance between the outer side of the expanded groove forming ring and the inner side of the recess in the outer mould is expediently, in certain radial cross sections, at least greater than or at least equal to the distance between the outer side of the core and the inner side of the outer mould.

This allows to have the portion of the plastic tube part deformed by inflation, shrunk on the rigid groove forming ring.

A second portion of the outer mould is on the abovementioned ring so as to simplify the construction of the device in accordance with the invention, which second portion co-operates fittingly with a first part of the outer mould.

To that end the second portion of the outer mould has a chamfered end which forms a recess together with the space in the first portion of the mould.

The outer mould comprises appropriately a line for cooling medium.

DESCRIPTION OF PREFERRED EMBODIMENTS

FIGS. 1 and 2a to 2e show a device comprising a core 26 which adjoins a socket forming mandril 25 via a conical intermediate part 9, for forming a socket 3 on a plastic tube part 1.

In order to form a socket at least that part of the plastic tube to be provided with said socket, is heated to over the plasticising temperature, for example 130° C. for polyvinyl chloride tubes. It will be obvious that various temperatures can be used for other kinds of plastics materials.

Figure 1:
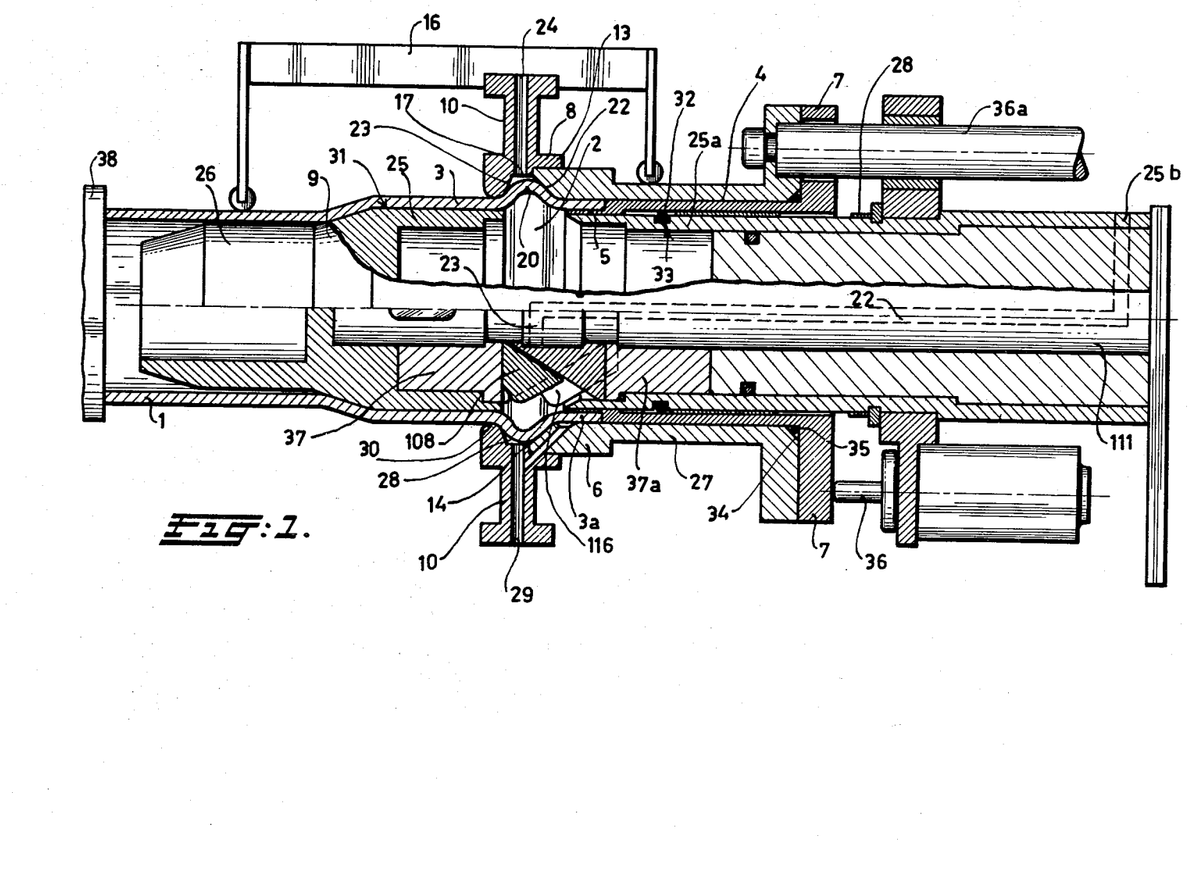
FIG. 1 shows a cross section of a device according to the invention.
Figure 2:
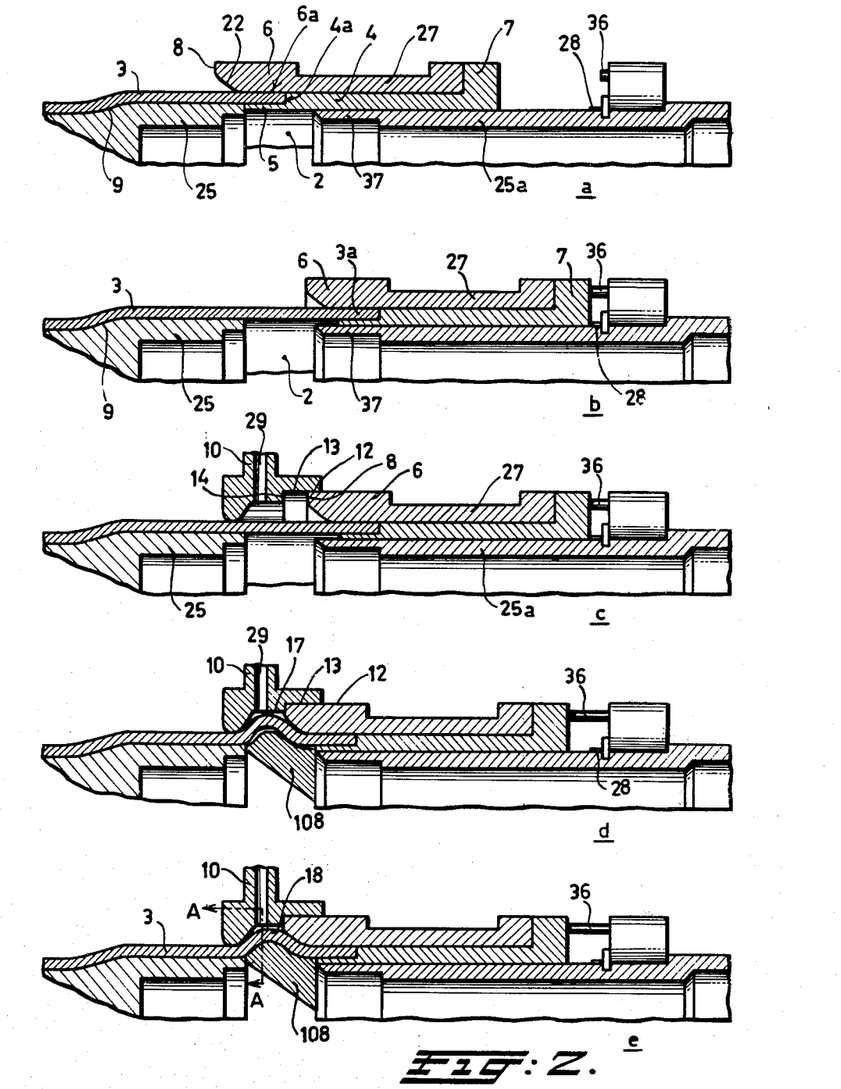
FIGS. 2a to 2e show various stages of the deformation of a plastic tube part while forming an internal circular groove.

Between the socket forming mandrils 25 and 25a an annular recess 2 is present, which is closed by means of a thin sleeve 5, in order to facilitate sliding on the plastic tube part 1. This sleeve 5 is an extension of a ring 4, which can fittingly slide over the outer side of the socket forming mandril 25. A first sealing ring 32 is accomodated in groove 33 so as to accomplish a seal between ring 4 and the socket forming mandril 25. Said ring 4 comprises a shoulder 7.

The ring likewise engages a second sleeve 27 which surrounds said ring 4. This sleeve 27 also comprises a shoulder 6 with an impact absorbing edge 8, adjoining the chamfer 22. The end edge of the second sleeve 27 comprises a chamfer 34 for obtaining a seal, whereby another sealing ring 35 adjoins this chamfer 34.

A recess is formed between the shoulder part 6 of the second sleeve 27 and the annular sleeve 5, in order to receive an end part 3a of the socket 3 to be formed.

Thereafter the end part 3a is received in the space between the inner wall 6a of the shoulder-shaped part 6 and the ring 5, the structure consisting of a ring 4 with the second sleeve 27 slid to the left, as illustrated in FIG. 2b. During this sliding movement of the ring 4 the sleeve 5 will be moved remote from the recess 2, so that an open circular space is created. The faces 108 and 116 form part of the groove forming ring.

After the impact absorbing edge 28 is reached, a divided outer mould 10 is accomodated at the location of the groove, to be formed around the socket 3. Said outer mould 10 comprises an impact absorbing edge 14 and a guiding edge 13, which impact absorbing edge 14 can co-operate with an impact absorbing edge 8 of the shoulder part 6 of the second sleeve 27. This co-operation is obtained by sliding a second sleeve 27 with a ring 4 to the left by an action of the plunger 36, so that simultaneously an upsetting of the plastic tube part at the location of the groove is performed. The impact absorbing edge 8 of the shoulder-shaped elevation 6 is pushed away until same adjoins the impact absorbing edge 14 of the first portion of the outer mould. The chamber 22 together with the base edge 17 and the chamfered edge 23 of the outer mould 10 form a circular recess 28 for forming a groove.

It goes without saying that the upsetting action can also be performed by pressing a plunger 36a against a sleeve 27 which sleeve 27 should then be rigidly connected with ring 4.

During this upsetting action, the tube being retained by means of a retaining plate 38, an inlet 25a supplies compressed air or gas to a medium supply line 22, which supply line discharge into a recess 2, through an outlet 23. By means of this compressed air the tube part is inflated until, in a cross section, the inner diameter of the inflated region equalizes at least the outer diameter of the expanded groove forming ring 4.

The inflation is preferably continued until a part 20 of the tube 3 adjoins the base 17 of a recess 28. In a cross section AA, see FIG. 2e, as seen from the base, the periphery of the groove forming ring 4 is smaller in an expanded condition than the inner circumference of the base 17 of the recess 28.

After the tube includes an inflated part 20 obtained by means of an inflation, the groove forming ring 4 is expanded until the same possesses its completed expanded position, while maintaining the medium pressure. After the expansion of the groove forming ring 4 the medium pressure is relieved.

Owing to these features the inflated tube part 20 will shrink upon the rigid groove forming ring 4 when the outer mould is cooled by supplying a cooling medium for example water or another liquid, through the cooling fluid line 29 and the outlet 24 so that a space is created between the base 7 of the recess 28 of the outer mould and the outer side 18 of the ready made groove. This results in a product having very good properties of strength.

The distance between the inner side 30 of the outer mould 10 and the outer side 31 of the socket forming mandril is preferably equal to or smaller than the distance between the base 17 and, seen in a radial cross section, the opposite outer side of the rigid groove forming ring 4.

In order to cool the socket 3 and the heated part of the tube 1 these regions are cooled by means of cooling medium supplied via a device 16.

Figure 3:
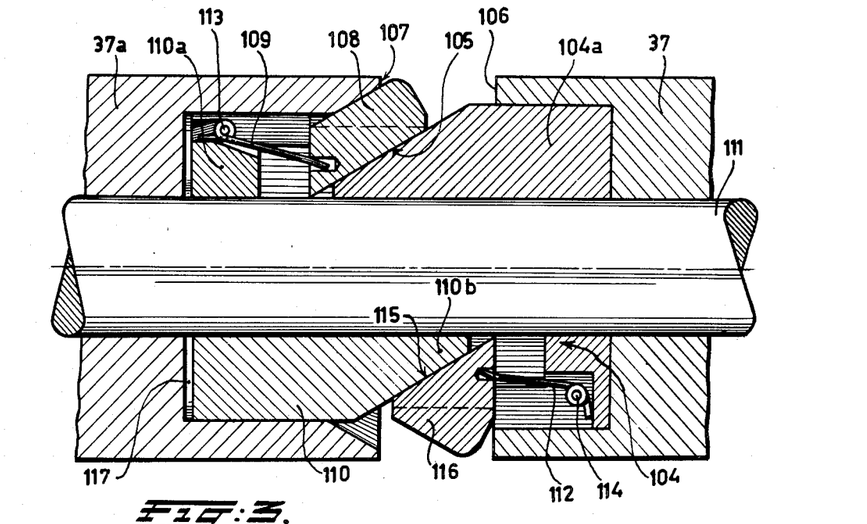
FIG. 3 shows a longitudinal section of a groove forming ring whereby the deformation segments are retracted.
Figure 4:
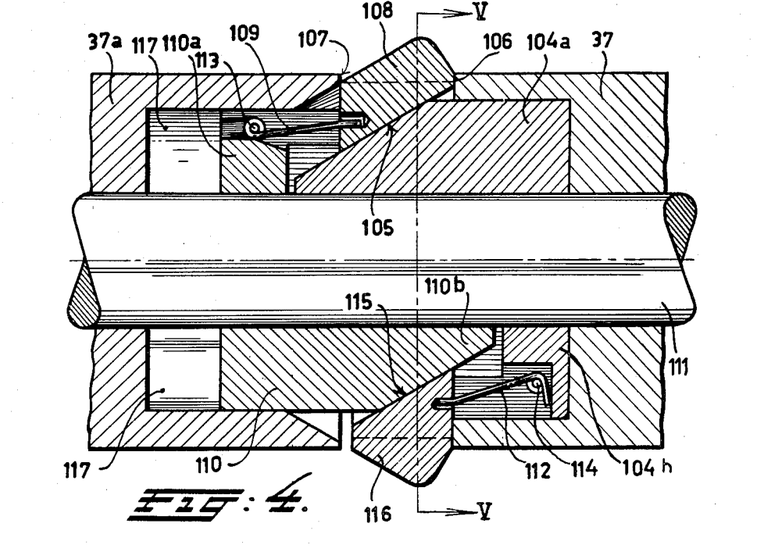
FIG. 4 an elevation of a device in FIG. 3 whereby the deformation segments are expanded.
Figure 5:
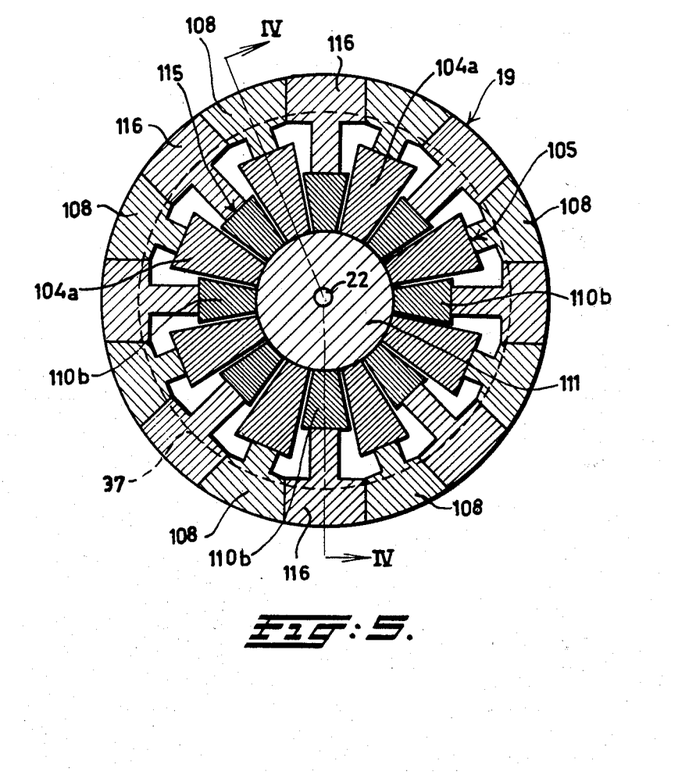
FIG. 5 a cross section according to the line V—V of FIG. 4.

On the basis of FIGS. 3 to 5 a preferred groove forming ring will now be described. This groove forming ring is to that end provided with interspaced radially movable metal deformation segments 116 and a second set of axially movable metal deformation segments 108. The first deformation segments 116 are moved radially outwards, by the action of a motive element 110 having parts 110a and 110b. These parts 110b are provided with bearing faces 115 which push the first deformation segments 116 outwards. The bearing faces 115 constitute together a first support member.

The first deformation segments 116 are connected with fixed connection points 114 via springs 112 on a body 104 which is rigidly connected with a core part 37. The body 104 comprises parts 104a and 104b, the parts 104a having support faces 105 which form a second support member on which bear second deformation segments 108, which second deformation segments 108 are connected to member 110 via springs 109. This motive member 110 can be moved in a chamber 127 to a core part 37a, for example by moving a shaft 111 together with the motive member 110 secured hereupon.

During this movement the portion 110b of the motive member will, by means of its bearing faces 115, move the first deformation segments 116 radially outwards, while forming a groove. The second set of deformation segments is simultaneously axially moved with an angle to the axis, by means of the parts 110a of the motive member and springs 109, whereby a bearing face 105 of the first support member 104a which is rigidly connected with another core part 37, continuously supports a second deformation segment 108 when the latter performs an axial movement.

As can be seen, the support faces 105a and the support faces 115 are places alternately so that on the one hand the radially movable deformation segments 116 can be moved outwards while on the other hand the second set of deformation segments 108 can be slid in between the first radially movable deformation segments 116. So as to achieve this the segments 108 and 116 are wedge-shaped whereby the wedge-shaped faces of the two segments are matched to each other.

By matching the co-operating surfaces 116a and 108a of the first and second deformation segments, a closed annular surface 19 is produced that serves for obtaining the desired groove in the plastic tube, when the latter is cooled down.

It goes without saying that various groove forming rings can be used, such as an inflatable rubber ring and other known groove forming rings, upon which the inflated part 20 of the tube part 3 is shrunk.

FIGS. 6–9 show a preferred part of the apparatus of the invention.

Figure 6:
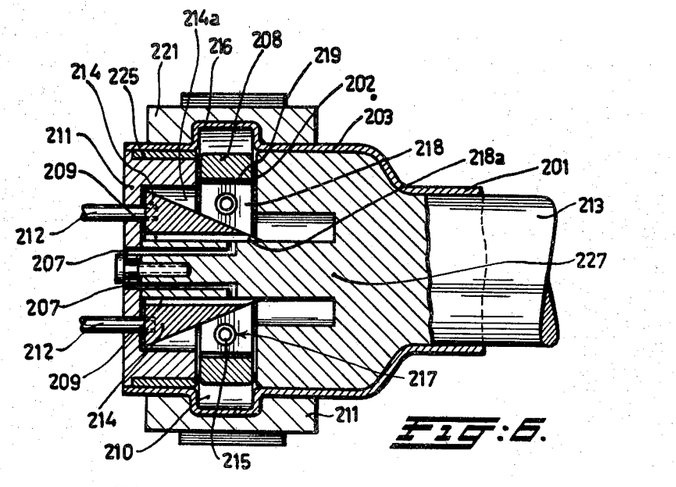
FIG. 6 an axial cross section of the end portion of a thermoplastic tubular pipe and part of the apparatus according to the present invention and shows the tube with a groove obtained by blowing but without a radially outwardly expanded moulding ring.

FIG. 6 shows a thermoplastic pipe 201 which has been pushed onto a mandril 213. The mandril 213 has an annular space in the form of a moulding ring housing 202. The housing 202 can conveniently be formed by a cylindrical end plate 211, which is connected by bolts 210 to a cylindrical body member of the mandril. The end plate 211 abuts a cylindrical part 227 of the body member of which portion the end plate 211 and body member are shaped so as to define an annular thrust cavity 226 which communicates to the housing 202 with the peripheral surface of the mandril 213.

Slidably mounted on and surrounding the peripheral surface of the cylindrical part 227 in the thrust cavity 226 is a conically shaped thrust member 214 which in the present embodiment provides the mechanical means for imparting a radial movement to the moulding ring 208. The thrust member 214 is provided with an inclined thrust cavity 226, across the annulus formed by the housing 202 in the mandril 213. An axially controled sliding movement of the thrust member 214 through the thrust cavity 226 is obtained by the control rods 212 which communicate with the thrust members through suitable apertures in the end plate 211.

Located in the annulus formed by the housing 202 is an expandable moulding ring 208 of solid elastomeric material. The moulding ring 208 surrounds the thrust member 214 and has associated therewith, a thrust ring 218 which is located between the moulding ring 208 and the thrust member 214, and surrounds the thrust member 214. The thrust ring 218 has an inclined inner surface 218a, which is complementary to and abuts the thrust surface 214a. Consequently during an axial movement of the thrust member 214 the inclined surfaces 214a and 218a slid over each other to impart radial movement to the thrust ring 218. As can be seen in the drawings the thrust ring is made of a plurality of radial thrust sections 218a of rigid material. Each section 218a is securely attached by bonding or otherwise at the outer circumference 219 of the thrust ring so formed to the inner cage of the moulding ring 208. The outer circumference of the thrust ring is provided with a flanged recess which engages with a complementary flanged rib provided on the inner edge of the moulding ring 218 to securely attach the two rings. The thrust sections 218a are so arranged that in neutral, unexpanded condition of the moulding ring, they form a solid, uninterrupted thrust ring, and when the thrust member 214 is moved axially the thrust sections are moved radially outwardly on the moulding ring to become circumferentially spaced by such radial movement.

The deformable moulding ring 208 has an external axial length fractionally less than the intended internal axial length of the groove to be formed on the tube. In its unstressed condition the elastomeric moulding ring 208 has an external diameter, slightly less than the internal diameter of the socket. The moulding ring 208 has an external surface which is preferably cylindrical. It will be realized however, that the external surface of the moulding ring can have an alternative shape which is governed by the desired shape of the finished groove.

In forming an annular internal groove or recess on the socket 203 the socket is heated in the zone where the groove is to be formed, the split cavity mould 221 assembled around the pipe, and the blockage in the form of the mandril 213 with its associated thrust member 214, thrust ring 218 and moulding ring 208 positioned in the socket so that the housing 202 is located at the zone where the groove is to be formed.

Subsequently the tube is deformed by subjecting the tube to an upsetting action as illustrated in FIG. 1; simultaneously an inner pressure is obtained by feeding a pressurized gaseous fluid, e.g. air, into the housing 202 through feed line 207. In order to have a good spreading of the air the thrust members 214 are provided with longitudinal slots 209 over their whole length.

When the socket 203 has conformed to the inner side of the recess 216 in the axially split mould 221, the thrust member 214 is moved axially through the thrust cavity by the control rods 212 thereby causing the thrust ring 218 to move radially outwardly. Such radial movement of the thrust ring 218 causes a moulding ring 208 to deform and be urged radially outwardly through the housing 202 and obtaining an outer diameter which is at most equal, but preferably somewhat less than the inner diameter of the groove. The socket is then cooled until the thermoplastic material is set. Thrust member 214 is now withdrawn to its original position to permit the moulding ring 208 to return into its housing 202 after which the mandril 213 can be removed from within the socket. The split cavity mould 221 is finally removed. During the shrinkage of the softened wall of the groove it has been found that the corners of the internal groove or recess so formed in the socket become strained. To reduce such strain on the thermoplastic material at the corners 204a of the groove the annular edges 221a of the cavity 216 are preferably rounded off, as illustrated.

As will be shown each radial first section 218a is provided with a hole 217 passing therethrough. The holes 217 are so formed that when the thrust sections are located in adjacent position to form the continuous uninterrupted thrust ring 218 an endless hole 217 is provided in the thrust ring. The hole 217 is of an annular cross section in an axial direction and is located to be concentric with the thrust ring 218. Housed in the holes 217 to pass through each thrust section 214, is an endless helical spring 215, the ends of which are joined. The spring 215 is tensioned to bias the thrust sections 218a radially inwardly to form the continuous thrust ring 218 and thereby causes the inclined surfaces 218a to remain in contact with the inclined surface of the thrust member 214a. In this modification the outer circumference surface 219 of the thrust ring 218 and the inner surface of the moulding ring 208 are of a cylindrical form, and are not attached, so that during a radial expansion of the thrust ring 218 the cylindrical surfaces abut and the moulding ring is urged radially outwardly to the position shown in FIG. 7. After a moulding operation and withdrawal of the thrust member 214 the thrust sections 218 move radially inwards under the action of spring 215 and the moulding ring moves radially inwards by its natural resilience.

Figure 7:
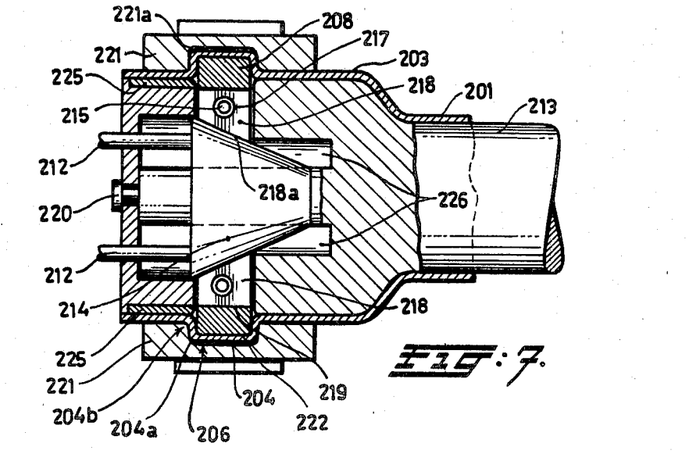
FIG. 7 a cross section similar to that in FIG. 6 with a moulding ring which has been expanded after having formed the groove.
Figure 8:
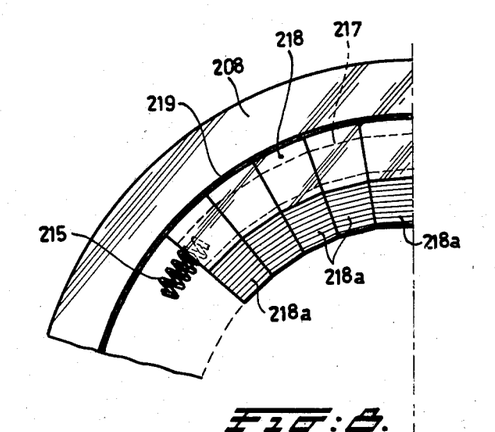
FIGS. 8 and 9 part of the moulding ring before and after the expansion, respectively.
Figure 9:
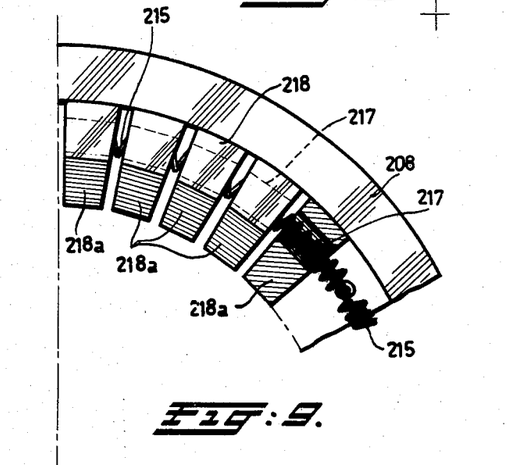

FIG. 7 shows that after shrinkage a small clearance exists between the bottom surface 206 and the surface 206 of the groove facing said surface 206. However, this clearance may be very small and may be approximately zero.

In order to push the pipe 201 over the housing 202 a ring 225 is used.

It will be appreciated that the thrust sections 218 can be fixed to the moulding ring.

Further details about such an apparatus have been disclosed in U.S. Pat. No. 3,484,900.

What is claimed is:

1. A method for forming an internal annular groove in a plastic tube part by sliding the part onto a core and surrounding same with a mold having an annular recess, heating the tube part and forming the groove by applying an expandable and retractable segmented rigid groove forming a ring in a recess in the interior of the tube part which ring is removed by a retracting action after forming the final groove and cooling down the plastic tube part, subjecting first the plastic tube part to the action of an internal medium overpressure in order to form a groove with a bottom having an inner circumference which is greater than the periphery of the completely expanded groove forming ring, performing an upsetting action simultaneously with the action of said internal medium overpressure and after having formed the groove by means of the internal medium overpressure moving the groove forming ring to its completely expanded position, whereafter the inner side of the groove which was formed by the internal medium overpressure is shrunk onto the completely expanded groove forming ring and the recess for expanding the groove forming ring is closed by a sleeve which is pushed away during sliding of the plastic tube part onto the core.

* * * * *